United States Patent
Yang et al.

(10) Patent No.: US 9,769,830 B2
(45) Date of Patent: Sep. 19, 2017

(54) TRANSMISSION METHOD AND APPARATUS BASED ON POINT-TO-POINT WIRELESS COMMUNICATION

(75) Inventors: Ning Yang, Shenzhen (CN); Qiuyan Lu, Shenzhen (CN); Yucong Chen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 76 days.

(21) Appl. No.: 14/389,280

(22) PCT Filed: Apr. 16, 2012

(86) PCT No.: PCT/CN2012/074150
§ 371 (c)(1),
(2), (4) Date: Sep. 29, 2014

(87) PCT Pub. No.: WO2013/155671
PCT Pub. Date: Oct. 24, 2013

(65) Prior Publication Data
US 2015/0063248 A1    Mar. 5, 2015

(51) Int. Cl.
*H04W 72/04*   (2009.01)
*H04W 88/00*   (2009.01)
(Continued)

(52) U.S. Cl.
CPC .......... *H04W 72/048* (2013.01); *H04W 8/18* (2013.01); *H04W 88/00* (2013.01); *H04L 1/16* (2013.01); *H04L 5/0055* (2013.01); *H04L 27/20* (2013.01)

(58) Field of Classification Search
None
See application file for complete search history.

(56) References Cited

U.S. PATENT DOCUMENTS 5,438,571 A * 8/1995 Albrecht ................. H04L 5/143
370/401
5,724,507 A * 3/1998 Iwatsuki ................. H04L 12/44
709/237
(Continued)

FOREIGN PATENT DOCUMENTS

| CN | 1941649 A   | 4/2007  |
|----|-------------|---------|
| CN | 101064621 A | 10/2007 |
| CN | 102115008 A | 4/2012  |

OTHER PUBLICATIONS

International Search Report in international application No. PCT/CN2012/074150, mailed on Jan. 10, 2013.
(Continued)

*Primary Examiner* — Duc Duong
(74) *Attorney, Agent, or Firm* — Oppedahl Patent Law Firm LLC

(57) ABSTRACT

The disclosure discloses a transmission method and a transmission apparatus based on point-to-point wireless communication. The method includes that: a state machine of a sending-receiving terminal performs state transition according to a received training frame; and when the state machine of the sending-receiving terminal is transferred to a data frame sending state, user data is sent. According to the disclosure, the sending-receiving terminal sends a preset training frame in a synchronous linking process so as to promote the rapid linking of two peer nodes; the saved linking time is spent to send data so as to increase the throughput of the user data; due to the state transition of the state machine, a receiver can determine the arrival time of a data frame, thereby improving the stability and the reliability of the system; and moreover, the training of the training frame can ensure that a receiver decodes a first data frame successfully, so that the flow of judging whether the received (Continued)

data is the user data by the receiver is simplified and the efficiency is improved.

20 Claims, 2 Drawing Sheets

(51) Int. Cl.
*H04W 8/18* (2009.01)
*H04L 5/00* (2006.01)
*H04L 27/20* (2006.01)
*H04L 1/16* (2006.01)

(56) References Cited

U.S. PATENT DOCUMENTS

| | | |
|---|---|---|
| 7,936,778 B2 | 5/2011 | Ungerboeck |
| 8,730,873 B2* | 5/2014 | Nikula .................. H04B 7/086 370/252 |
| 8,913,582 B1* | 12/2014 | Zhang ................. H04B 7/0619 370/235 |
| 2004/0190519 A1* | 9/2004 | Dugatkin ........... H04B 17/0085 370/394 |
| 2005/0018784 A1* | 1/2005 | Kurobe ................. H04L 1/0003 375/260 |
| 2007/0076722 A1 | 4/2007 | Ungerboeck |
| 2009/0252140 A1* | 10/2009 | Imaeda ................ H04B 7/0617 370/342 |
| 2010/0220601 A1* | 9/2010 | Vermani ............... H04W 28/04 370/248 |
| 2010/0226349 A1 | 9/2010 | Matsuo |
| 2011/0205934 A1 | 8/2011 | Ungerboeck |
| 2012/0044900 A1 | 2/2012 | Morioka |
| 2012/0230206 A1* | 9/2012 | Baliga .................. H04W 16/18 370/243 |
| 2012/0271902 A1* | 10/2012 | Baliga ................ H04L 43/0811 709/209 |
| 2013/0243011 A1 | 9/2013 | Ungerboeck |

OTHER PUBLICATIONS

English Translation of the Written Opinion of the International Search Authority in international application No. PCT/CN2012/074150, mailed on Jan. 10, 2013.

Supplementary European Search Report in European application No. 12874791.2, mailed on Apr. 30, 2015.

* cited by examiner

Microwave communication node

Peer microwave communication node

TRANSMISSION METHOD AND APPARATUS BASED ON POINT-TO-POINT WIRELESS COMMUNICATION

FIELD

The disclosure relates to the field of wireless communications, and more particularly to a transmission method and a transmission apparatus based on point-to-point wireless communication.

BACKGROUND

Microwave communication, optical fiber communication and satellite communication are three major means of modern communication transmission. The microwave communication, which generally adopts the point-to-point transmission, is now mainly applied to the bearer network of the 2G/3G mobile service to provide a mobile operator with the transmission of voice and data service, and has the characteristics of large transmission capacity, stable long-distance transmission quality, small investment, short construction cycle, convenient maintenance and the like.

The typical network topology that the microwave communication is applied to the mobile bearer network is as shown in FIG. 1. The point-to-point scenario can be applied to the backbone transmission between base stations or between a base station and a control station of the base station or an access gateway.

Generally, a microwave communication node consists of a modem unit and a Radio Frequency (RF) sending-receiving unit, wherein the modem unit includes a base-band interface and a modem unit and is usually placed inside a room and thus is called an In-Door Unit (IDU). The RF sending-receiving unit mainly implements an RF sending-receiving function and is usually placed on an iron tower with an antenna, and is called an Out-Door Unit (ODU).

With the development of the mobile wireless network and the Ethernet technology, the microwave transmission is gradually developed from the traditional Time Division Multiplexing (TDM) service transmission into the modern hybrid service transmission, i.e., a hybrid mode of various data, such as TDM, E1 and Ethernet; and the transmission capacity also increases gradually. Data from different interfaces is uniformly scheduled and encapsulated into a data frame to be modulated by the modem unit and then sent out through the RF unit.

However, by a microwave communication data transmission method in the related arts, a receiving terminal would not receive the data frame correctly, so that the microwave communication is very poor in reliability. The processing processes of the modem unit at a sending terminal and a receiving terminal in the traditional microwave communication are as shown in FIGS. 2 and 3. Specifically, in the traditional microwave communication, after a system is powered on, the Media Access Control (MAC) layer data of the sending terminal is subjected to channel encoding, framing, and digital intermediate-frequency processing in sequence to be sent out; and the receiving terminal performs digital intermediate-frequency processing, synchronization, equalization, de-framing and channel decoding on the received data to obtain MAC layer data, wherein the synchronization and equalization of the receiving terminal need to be gradually converged based on user data; and at present, pilot frequency may be inserted in the user data in an equal interval to speed up the synchronization and equalization, but the following problems still exist: 1, the user data sent initially may be wasted since the synchronization and the equalization are not converged; and 2, although the pilot frequency exists in the data frame, the pilot frequency in the data frame is generally small in density in order to maximize the user throughput, accordingly, the convergence speed for the synchronization and the equalization is very low and the data sent initially would also be wasted.

SUMMARY

In view of this, the disclosure is to provide a transmission method and a transmission apparatus based on point-to-point wireless communication, so as to ensure the reliability of communication and improve the data throughout.

To this end, the technical scheme of the disclosure is implemented as follows.

A transmission method based on point-to-point wireless communication includes that:

a state machine of a sending-receiving terminal performs state transition according to a received training frame; and when the state machine of the sending-receiving terminal is transferred to a data frame sending state, user data is sent.

The training frame may include a request training frame, a response training frame and an ACK training frame; and the state of the state machine may include a request sending state, a response sending state, an ACK sending state and a data frame sending state.

The step that the state machine of the sending-receiving terminal performs state transition according to a received training frame may include that:

when the number of training frames of the same type received by the state machine of the sending-receiving terminal reaches a preset number, state transition is performed according to the current state of the state machine and the type of the training frame.

The step that state transition is performed according to a received training frame may include that:

when the state machine of the sending-receiving terminal is in the initial request sending state and the received training frame is a request training frame, the state machine is transferred to the response sending state; and when the received training frame is the response training frame, the state machine is transferred to the ACK sending state.

The step that state transition is performed according to the type of the received training frame may include that:

when the state machine of the sending-receiving terminal is in the response sending state and the received training frame is a response training frame or an ACK training frame, the state machine is transferred to the ACK sending state.

The step that state transition is performed according to the type of the received training frame may include that:

when the state machine of the sending-receiving terminal is in the ACK sending state and the request training frame is received, the state machine is transferred to the response sending state; and when the number of the sent ACK reaches a preset threshold, the state machine is transferred to the data frame sending state.

The step that user data is sent may include that:

a first frame of the user data is sent in the same modulation way as that of the training frame.

A transmission apparatus based on point-to-point wireless communication includes a state transition unit and a sending unit, wherein the state transition unit is configured to perform state transition on a state machine according to a received training frame; and the sending unit is configured to send user data when the state machine is transferred to a data frame sending state.

The training frame may include a request training frame, a response training frame and an ACK training frame; and the state of the state machine may include a request sending state, a response sending state, an ACK sending state and a data frame sending state.

When the number of training frames of the same type received reaches a preset number, the state transition unit performs state transition according to the current state of the state machine and the type of the training frame.

When the state machine is in the initial request sending state and the received training frame is the request training frame, the state transition unit transfers the state machine to the response sending state; and when the received training frame is the response training frame, the state transition unit transfers the state machine to the ACK sending state.

When the state machine is in the response sending state and the received training frame is the response training frame or the ACK training frame, the state transition unit transfers the state machine to the ACK sending state.

When the state machine is in the ACK sending state and the request training frame is received, the state transition unit transfers the state machine to the response sending state; and when the number of the sent ACKs reaches a preset threshold, the state transition unit transfers the state machine to the data frame sending state.

The sending unit is configured to send a first frame of user data in the same modulation way as that of the training frame.

According to the disclosure, the sending-receiving terminal sends a preset training frame in a synchronous linking process so as to promote the rapid linking of two peer nodes; the saved linking time is spent to send data so as to increase the throughput of the user data; due to the state transition of the state machine, a receiver can determine the arrival time of a data frame, thereby improving the stability and the reliability of the system; and moreover, the training of the training frame can ensure that a receiver can decode a first data frame successfully, so that the flow of judging whether the received data is the user data by the receiver is simplified and the efficiency is improved.

DETAILED DESCRIPTION

An idea expressed in the disclosure is that: a state machine of a sending-receiving terminal performs state transition according to a received training frame; and when the state machine of the sending-receiving terminal is transferred to a data frame sending state, user data is sent.

To describe the idea, technical scheme and advantages of the disclosure more clearly, the disclosure is further explained below with reference to the embodiments and the accompanying drawings in detail.

Figure 1:
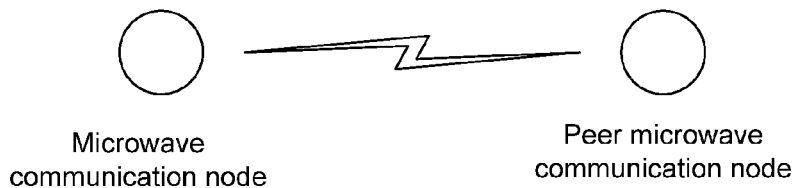
FIG. 1 is a diagram showing a typical network topology when the existing microwave communication is applied to a mobile bearer network.
Figure 2:
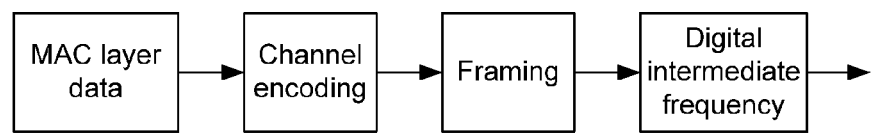
FIG. 2 is a diagram showing the processing process of a modem unit at a sending terminal.
Figure 3:
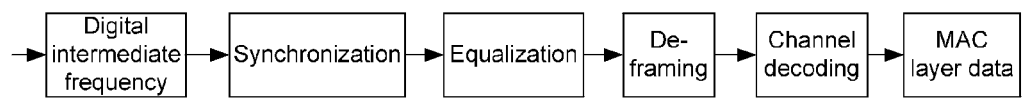
FIG. 3 is a diagram showing the processing process of a modem unit at a receiving terminal.
Figure 4:
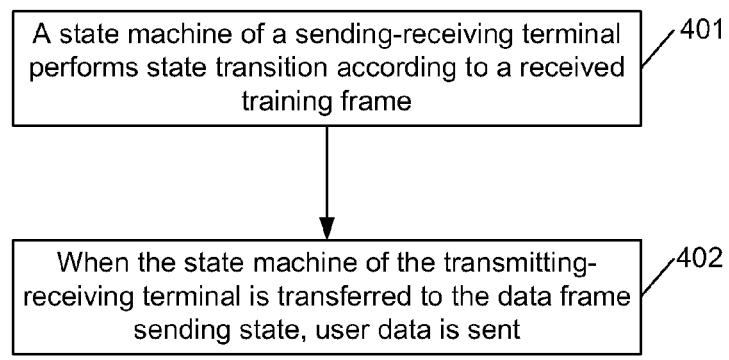
FIG. 4 is a diagram showing the implementation flow of a transmission method based on point-to-point wireless communication of the disclosure.

FIG. 4 shows the implementation flow of a transmission method based on point-to-point wireless communication of the disclosure. As shown in FIG. 4, the method includes the following steps.

Step 401: A state machine of a sending-receiving terminal performs state transition according to a received training frame.

Specifically, the training frame includes a request training frame, a response training frame and an ACK training frame; the main body of the training frame is formed by a symbol acquired by the sending-receiving terminal in advance, and is generally generated from a pseudorandom sequence and modulated in a Quadrature Phase Shift Keying (QPSK) modulation way; and in order to support the four-way handshake of the sending-receiving terminal, besides a preamble for frame synchronization, each training frame further includes a handshake information domain, the information of which is used for indicating the type of a received training frame so that a sending terminal can determine which kind of training frame is sent. Furthermore, in order to determine the type of the received training frame more accurately, the indication information in the handshake information domain can be subjected to channel encoding, wherein Reed Muller (RM) encoding is generally adopted; and furthermore, after the encoding, the process may be repeated for a preset number of times so as to ensure the reliable transmission of the information.

The step that the state machine of the sending-receiving terminal performs state transition according to a received training frame includes that:

when the number of training frames of the same type received by the state machine of the sending-receiving terminal reaches a preset number, state transition is performed according to the current state of the state machine and the type of the training frame.

Figure 5:
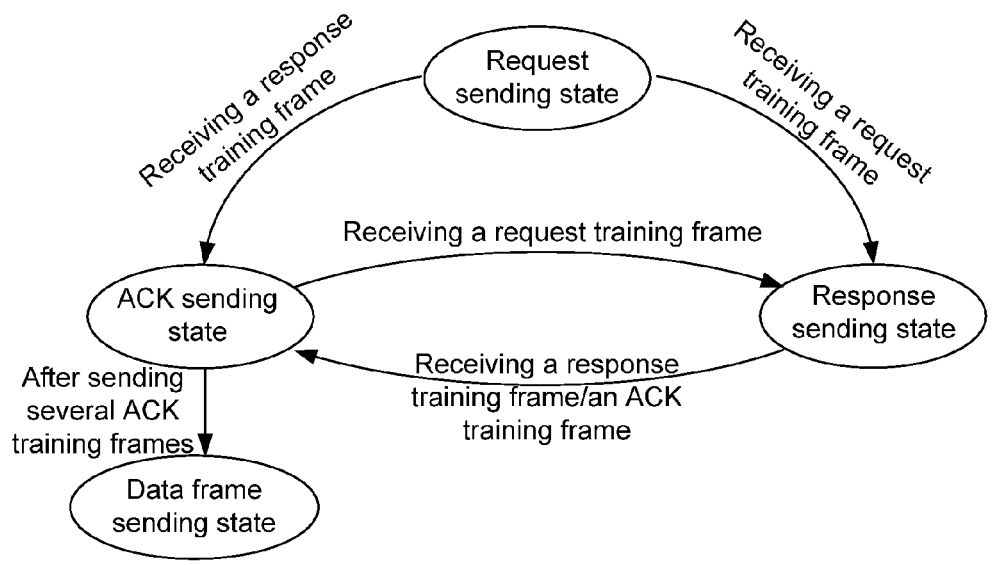
FIG. 5 is a diagram showing the state transition in a transmission method based on point-to-point wireless communication of the disclosure.

Specifically, the state transition process is described in detail here in combination with the diagram showing the state transition in the transmission method shown in FIG. 5.

The state of the state machine includes a request sending state, a response sending state, an ACK sending state and a data frame sending state, wherein the initial state of the state machine is the request sending state. Specifically, as shown in FIG. 5, when the state machine of the sending-receiving terminal is in the initial request sending state and the received training frame is the request training frame, the state machine is transferred to the response sending state; and when the received training frame is the response training frame, the state machine is transferred to the ACK sending state. When the state machine of the sending-receiving terminal is in the response sending state and the received training frame is the response training frame or the ACK training frame, the state machine is transferred to the ACK sending state. When the state machine of the transmitting-receiving terminal is in the ACK sending state and the request training frame is received, the state machine is transferred to the response sending state; and when the number of the sent ACKs reaches a preset threshold, the state machine is transferred to the data frame sending state.

Step 402: When the state machine of the transmitting-receiving terminal is transferred to the data frame sending state, user data is sent.

Specifically, when the state machine of the sending-receiving terminal is in the data frame sending state, the user data may be sent all the time, wherein a first frame of the user data is sent usually in the same modulation way as that of the training frame. Furthermore, if the current channel condition is very good, a modulation encoding way with a high channel utilization rate may be directly adopted for the sending.

Figure 6:
FIG. 6 is a diagram showing a structure of a transmission apparatus based on point-to-point wireless communication of the disclosure.

FIG. 6 shows a structure of a transmission apparatus based on point-to-point wireless communication of the disclosure. As shown in FIG. 6, the apparatus includes a state transition unit and a sending unit, wherein the state transition unit is configured to perform state transition on a state machine according to a received training frame; and the sending unit is configured to send user data when the state machine is transferred to a data frame sending state.

The training frame includes a request training frame, a response training frame and an ACK training frame; the training frame includes a main body, a preamble for frame synchronization and a handshake information domain, wherein the main body is generated from a pseudorandom sequence and is modulated in a QPSK modulation way; the handshake information domain is used for indicating the type of a received training frame, and the indication information in the handshake information domain is subjected to channel encoding generally by RM encoding; and furthermore, after the encoding, the process may be repeated for a preset number of times so as to ensure the reliable transmission of the information.

The state of the state machine includes a request sending state, a response sending state, an ACK sending state and a data frame sending state.

The state transition unit is configured to perform state transition according to the current state of the state machine and the type of the training frame when the number of training frames of the same type received reaches a preset number.

The state transition unit is configured to transfers the state machine to the response sending state when the state machine is in the initial request sending state and the received training frame is a request training frame, and to transfers the state machine to the ACK sending state when the received training frame is a response training frame.

The state transition unit is configured to transfers the state machine to the ACK sending state when the state machine is in the response sending state and the received training frame is a response training frame or an ACK training frame.

The state transition unit is configured to transfers the state machine to the response sending state when the state machine is in the ACK sending state and a request training frame is received, and to transfers the state machine to the data frame sending state when the number of the sent ACKs reaches a preset threshold. When the state machine of the sending-receiving terminal is in the data frame sending state, user data may be sent all the time.

The sending unit is configured to send a first frame of the user data in the same modulation way as that of the training frame; and furthermore, if the current channel condition is very good, a modulation encoding way with a high channel utilization rate may be directly adopted for the sending.

The above are only the embodiments of the disclosure, and are not intended to limit the scope of protection of the claims of the disclosure.

What is claimed is:

1. A method of transmission based on point-to-point wireless communication, comprising:
   performing, by a state machine of a sending-receiving terminal, state transition according to a received training frame; and
   sending user data when the state machine of the sending-receiving terminal is transferred to a data frame sending state;
   wherein the training frame selected from the group consisting of: a request training frame, a response training frame, or an acknowledgement (ACK) training frame; and wherein a state of the state machine selected from the group consisting of: a request sending state, a response sending state, an ACK sending state, or a data frame sending state.

2. The method according to claim 1, wherein
   performing, by the state machine of the sending-receiving terminal, the state transition according to the received training frame comprises:
   when the number of training frames of a same type received by the state machine of the sending-receiving terminal reaches a preset number, performing the state transition according to a current state of the state machine and the type of the training frame.

3. The method according to claim 2, wherein sending the user data comprises:
   sending a first frame of the user data in a same modulation way as that of the training frame.

4. The method according to claim 1, wherein performing the state transition according to the received training frame comprises:
   transferring the state machine to the response sending state when the state machine of the sending-receiving terminal is in an initial request sending state and the received training frame is the request training frame; and transferring the state machine to the ACK sending state when the received training frame is the response training frame.

5. The method according to claim 4, wherein sending the user data comprises:
   sending a first frame of the user data in a same modulation way as that of the training frame.

6. The method according to claim 1, wherein performing the state transition according to the type of the received training frame comprises:
   transferring the state machine to the ACK sending state when the state machine of the sending-receiving terminal is in the response sending state and the received training frame is the response training frame or the ACK training frame.

7. The method according to claim 6, wherein sending the user data comprises:
   sending a first frame of the user data in a same modulation way as that of the training frame.

8. The method according to claim 1, wherein performing the state transition according to the type of the received training frame comprises:
   transferring the state machine to the response sending state when the state machine of the sending-receiving terminal is in the ACK sending state and the request training frame is received; and transferring the state machine to the data frame sending state when the number of sent ACKs reaches a preset threshold.

9. The method according to claim 8, wherein sending the user data comprises:

sending a first frame of the user data in a same modulation way as that of the training frame.

10. The method according to claim 1, wherein sending the user data comprises:
sending a first frame of the user data in a same modulation way as that of the training frame.

11. An apparatus of transmission based on point-to-point wireless communication, the apparatus is applied in a state machine and comprises:
a memory storing programmed instructions; and
a processor configured to be capable of executing the stored programmed instructions to performed steps comprising:
performing, by a state machine of a sending-receiving terminal, state transition according to a received training frame; and
sending user data when the state machine of the sending-receiving terminal is transferred to a data frame sending state;
wherein the training frame selected from the group consisting of: a request training frame, a response training frame, or an acknowledgement (ACK) training frame; and wherein a state of the state machine selected from the group consisting of: a request sending state, a response sending state, an ACK sending state, or a data frame sending state.

12. The apparatus according to claim 11, wherein the processor is further configured to be capable of executing the stored programmed instructions to performed steps further comprising:
performing the state transition according to a current state of the state machine and the type of the training frame when the number of training frames of a same type received reaches a preset number.

13. The apparatus according to claim 12, wherein the processor is further configured to be capable of executing the stored programmed instructions to perform steps further comprising:
sending a first frame of the user data in a same modulation way as that of the training frame.

14. The apparatus according to claim 11, wherein the processor is further configured to be capable of executing the stored programmed instructions to perform steps further comprising:
transferring the state machine to the response sending state when the state machine is in an initial request sending state and the received training frame is the request training frame, and transferring the state machine to the ACK sending state when the received training frame is the response training frame.

15. The apparatus according to claim 14, wherein the processor is further configured to be capable of executing the stored programmed instructions to perform steps further comprising:
sending a first frame of the user data in a same modulation way as that of the training frame.

16. The apparatus according to claim 11, wherein t the processor is further configured to be capable of executing the stored programmed instructions to perform steps further comprising:
transferring the state machine to the ACK sending state when the state machine is in the response sending state and the received training frame is the response training frame or the ACK training frame.

17. The apparatus according to claim 16, wherein the processor is further configured to be capable of executing the stored programmed instructions to perform steps further comprising:
sending a first frame of the user data in a same modulation way as that of the training frame.

18. The apparatus according to claim 11, wherein t the processor is further configured to be capable of executing the stored programmed instructions to perform steps further comprising:
transferring the state machine to the response sending state when the state machine is in the ACK sending state and the request training frame is received, and transferring the state machine to the data frame sending state when the number of sent ACKs reaches a preset threshold.

19. The apparatus according to claim 18, wherein the processor is further configured to be capable of executing the stored programmed instructions to perform steps further comprising:
sending a first frame of the user data in a same modulation way as that of the training frame.

20. The apparatus according to claim 11, wherein the processor is further configured to be capable of executing the stored programmed instructions to perform steps further comprising:
sending a first frame of the user data in a same modulation way as that of the training frame.

* * * * *